United States Patent [19]
Stenfert et al.

[11] Patent Number: 5,413,434
[45] Date of Patent: May 9, 1995

[54] METHOD AND INSTALLATION FOR LAYING A PIPELINE

[75] Inventors: Gerhardus A. P. Stenfert, Nootdorp; Robert P. Hovinga, Naaldwijk; Eugène A. Bajema, Zoetermeer, all of Netherlands

[73] Assignee: Allseas Engineering B.V., Netherlands

[21] Appl. No.: 109,617

[22] Filed: Aug. 20, 1993

[30] Foreign Application Priority Data

Aug. 21, 1992 [BE] Belgium .................. 09200748

[51] Int. Cl.⁶ .................................... F16L 1/16
[52] U.S. Cl. .................................. 405/166; 405/168.1
[58] Field of Search ............ 405/158, 166, 167, 168.1, 405/168.3, 168.4, 169, 170

[56] References Cited

U.S. PATENT DOCUMENTS

| | | | |
|---|---|---|---|
| 3,581,506 | 6/1971 | Howard | 405/166 |
| 3,822,559 | 7/1974 | Matthews et al. | 405/166 |
| 4,073,156 | 2/1978 | Smith | 405/166 X |
| 5,044,825 | 9/1991 | Kaldenbach | 405/166 |

Primary Examiner—David H. Corbin
Attorney, Agent, or Firm—Mark Zovko

[57] ABSTRACT

During laying of a pipeline on a surface located under water, on a vessel a pipe is fitted to a pipe string of the pipeline, in each case during a fitting step. Herein during the fitting step the vessel is moved substantially continuously in lengthwise direction of the pipe string while a pipe is fitted to the pipe string by means of positioning means moved relative to the vessel and by means of welding means moved relative to the vessel. According to the invention, a train of positioning means, welding means and clamping means is moved during an operational phase relative to the vessel in lengthwise direction of the pipe string in principle together with the pipe string and during a resetting phase set between two successive operational phases this train is displaced in the direction of the prow of the vessel relative to the pipe string and relative to the vessel. The pipe string is herein held fixedly on the train by means of the clamping means and the train is held fixedly on the vessel by means of coupling means.

6 Claims, 5 Drawing Sheets

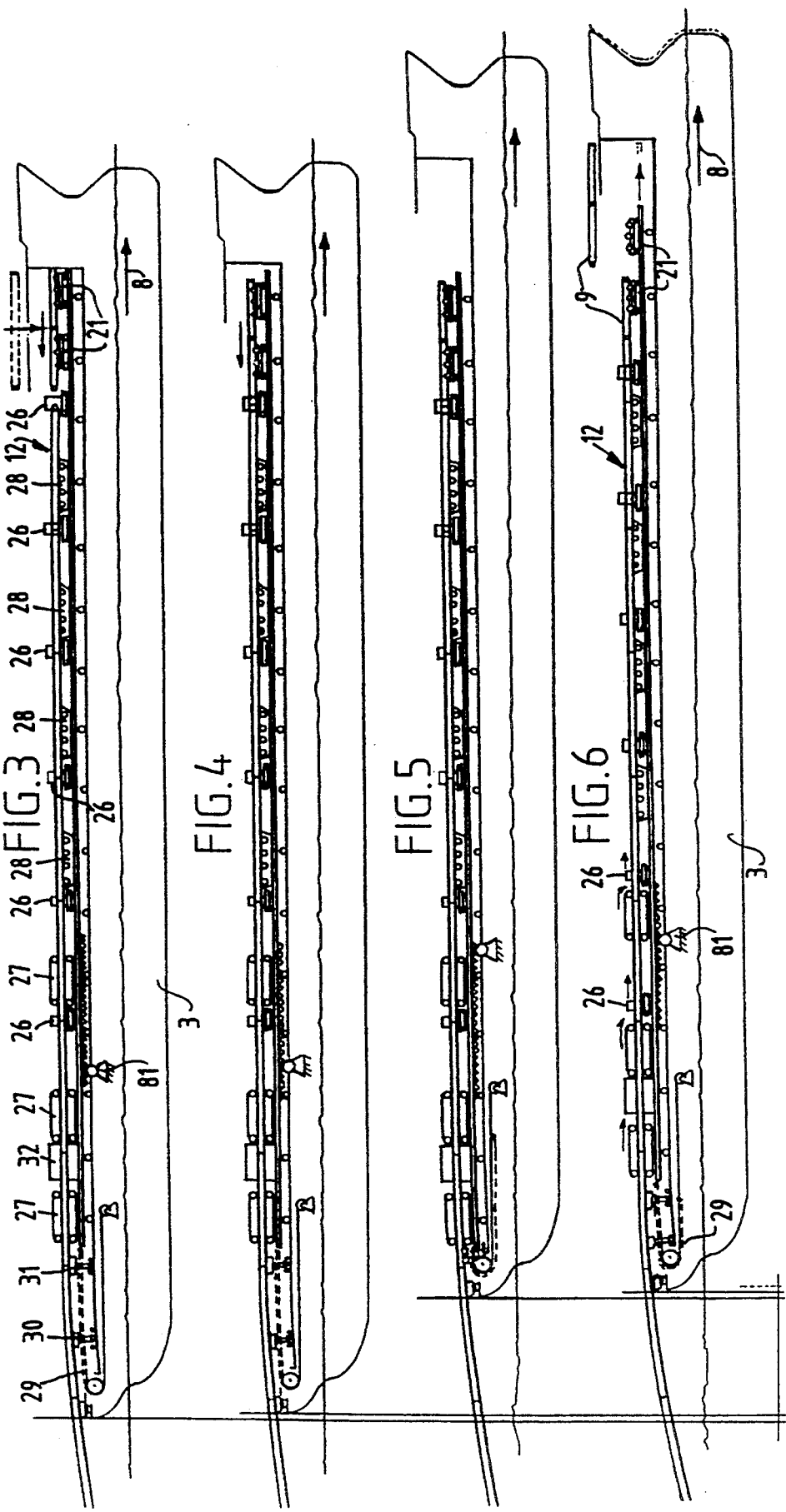

METHOD AND INSTALLATION FOR LAYING A PIPELINE

The invention relates to a method as designated in the preamble to claim 1.

Such a method is known from NL-A-89.02622. Herein the pipe string is supported from place to place and held under tension by means of clamps which are clamped fixedly on the pipe string and are then moved along with the pipe string but which are released from the pipe string from time to time and then moved in opposing direction relative to the vessel, while the movement of the pipe string relative to the vessel is braked using sufficient other clamping devices still clamped fixedly to the pipe string. The welding means moving along with the pipe string consist of carriages which at the end of their rearward movement are taken off the pipe string and then moved back in forward direction following a parallel return path.

This method has the advantage of a continuous process but is complicated and requires a sizeable installation because the welding operations are interrupted by the clamps passing over the joint and because much space is required for return of the clamps and the welding means.

In another method, after each operational period the vessel is warped stepwise relative to the pipe string, and during the operational period activities are performed at diverse mutually spaced stations on the joint positions of the pipe string.

The activities at the diverse joint positions are if possible chosen so as to be of the same duration in order to utilize the available time at each station as well as possible. For a short part of the time of the warping period the activities are still continued; for a considerable part of the time of the warping period the activities on the pipe string are at a standstill. Setting the vessel into motion and braking thereof each time requires so much propulsion force due to the enormous mass of the vessel that the warping period is long.

The invention has for its object to provide a method wherein the drawbacks of the long warping period associated with the intermittent forward movement of the vessel in addition to the drawbacks associated with the known continuous method are obviated to a significant extent. To this end the method according to the invention has the characteristic of claim 1.

The method according to the invention has the advantage of the continuous method, namely that the vessel does not have to be accelerated and braked each time during a resetting phase, but also has advantages of the intermittent method in that in the operational phase the weld positions of the pipe string can be processed without interruption using a comparatively simple device. With this method a pipe string of great length can be laid per hour because the ship's length is well utilized.

Known from FR-A-2024176 is a method and installation for laying a pipeline wherein during an operational phase a train of positioning means, welding means and clamping means is held in place, in principle together with the pipe string, in relation to the non-forward moving vessel. The vessel herein sails forward in stepwise manner and during this stepwise forward movement the pipe string is moved relative to the train, while in relation to the vessel the train remains practically in place. The train travels reciprocally over small distances to compensate undulating movements of the vessel. The free travel path for the said train is not long enough to perform the method according to the invention.

The invention also relates to and provides an installation as designated in claim 4.

The invention will be elucidated in the description following hereinafter with reference to drawings in which:

FIGS. 3–6 show schematic longitudinal sections of the installation according to the invention in successive stages during performing of an operational cycle;

FIG. 10 shows on enlarged scale a section through a weld between two pipes.

Figure 1:
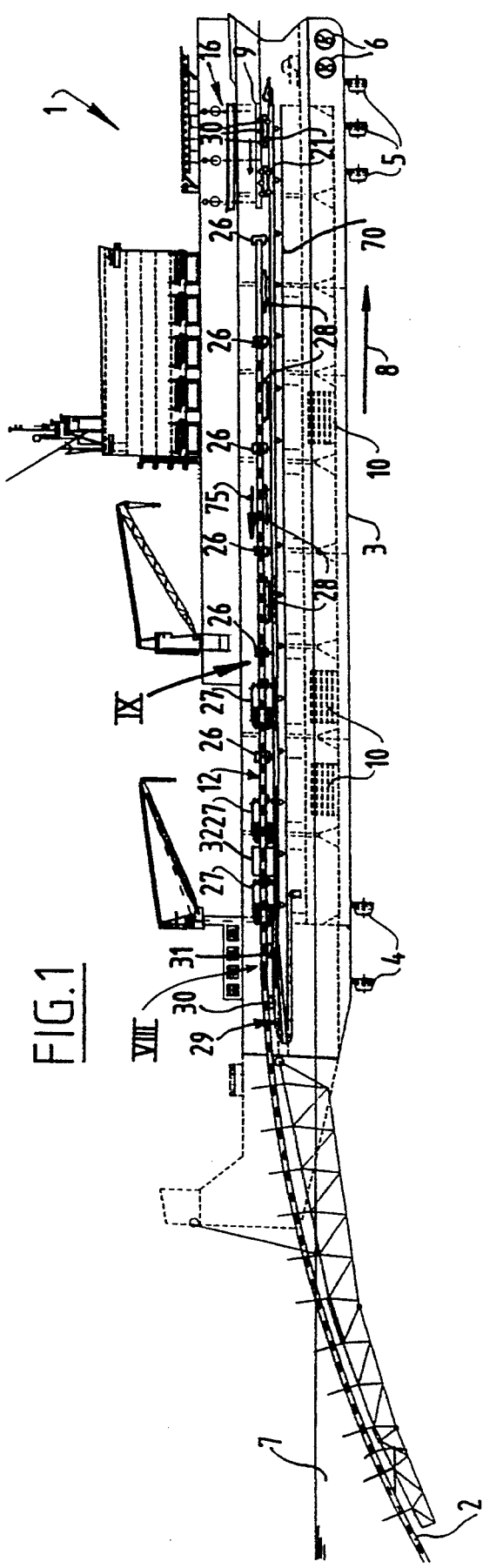
FIGS. 1 and 2 show respectively a longitudinal section and horizontal section through an installation according to the invention.
Figure 2:
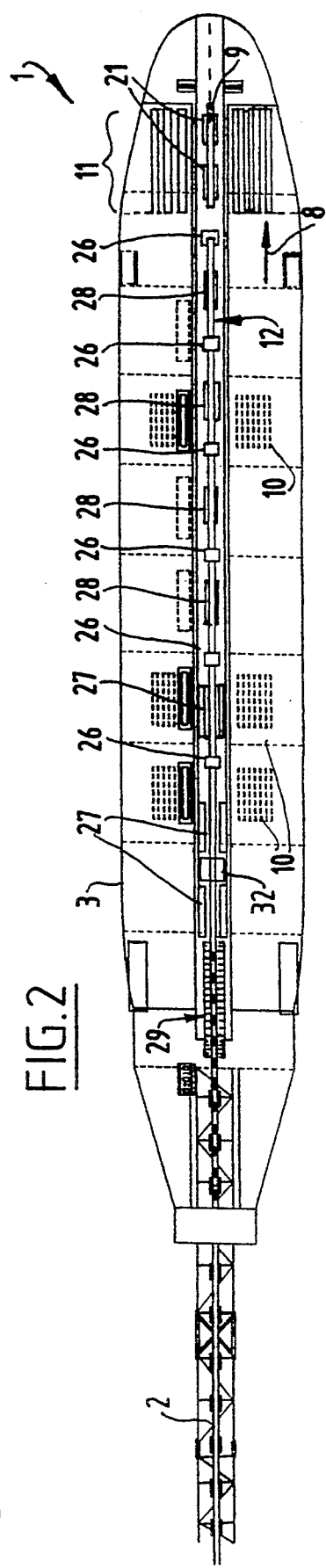
Figure 7:
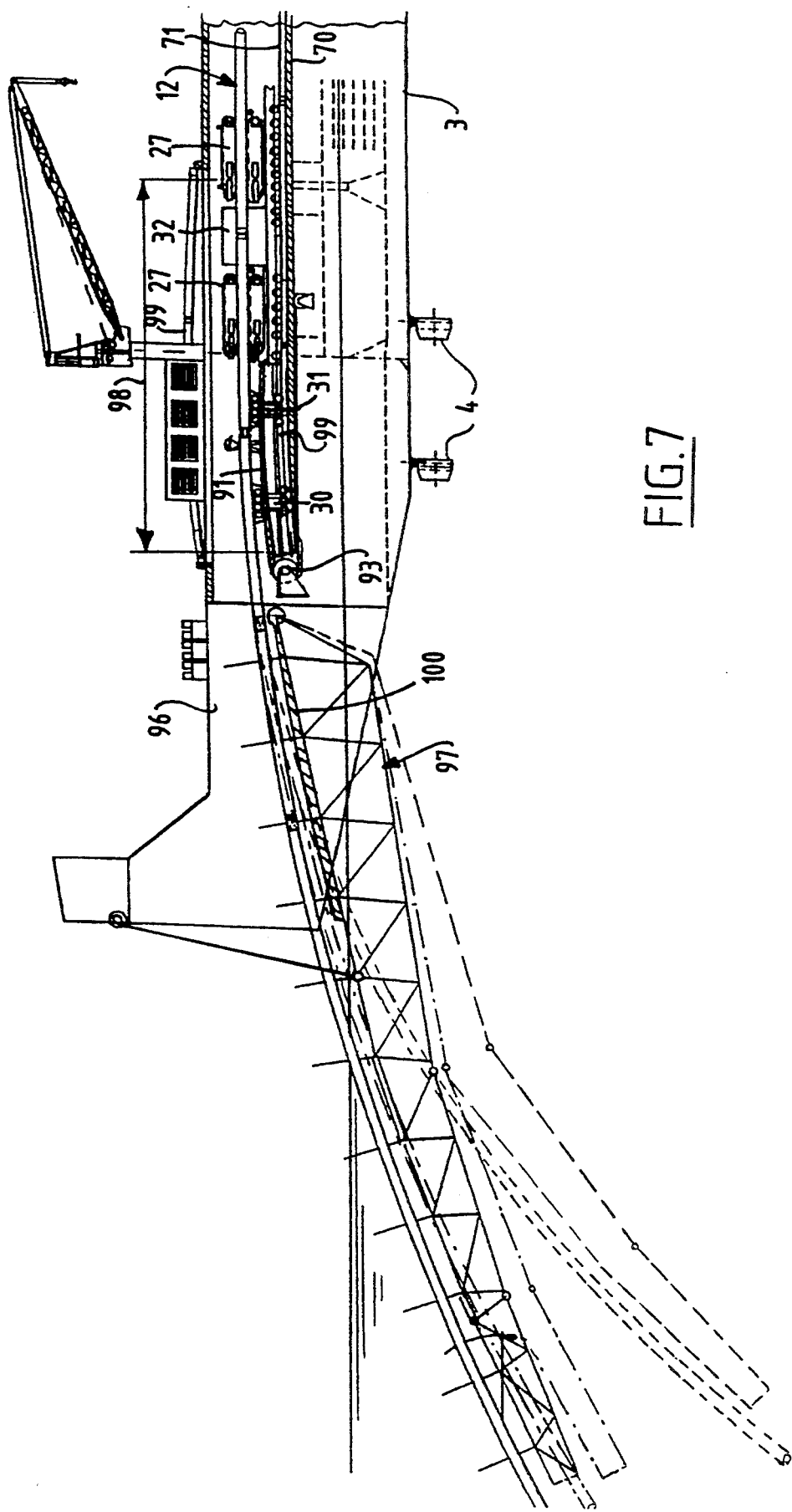
FIG. 7 shows on enlarged scale a longitudinal section through the rear part of the installation of FIG. 1.
Figure 8:
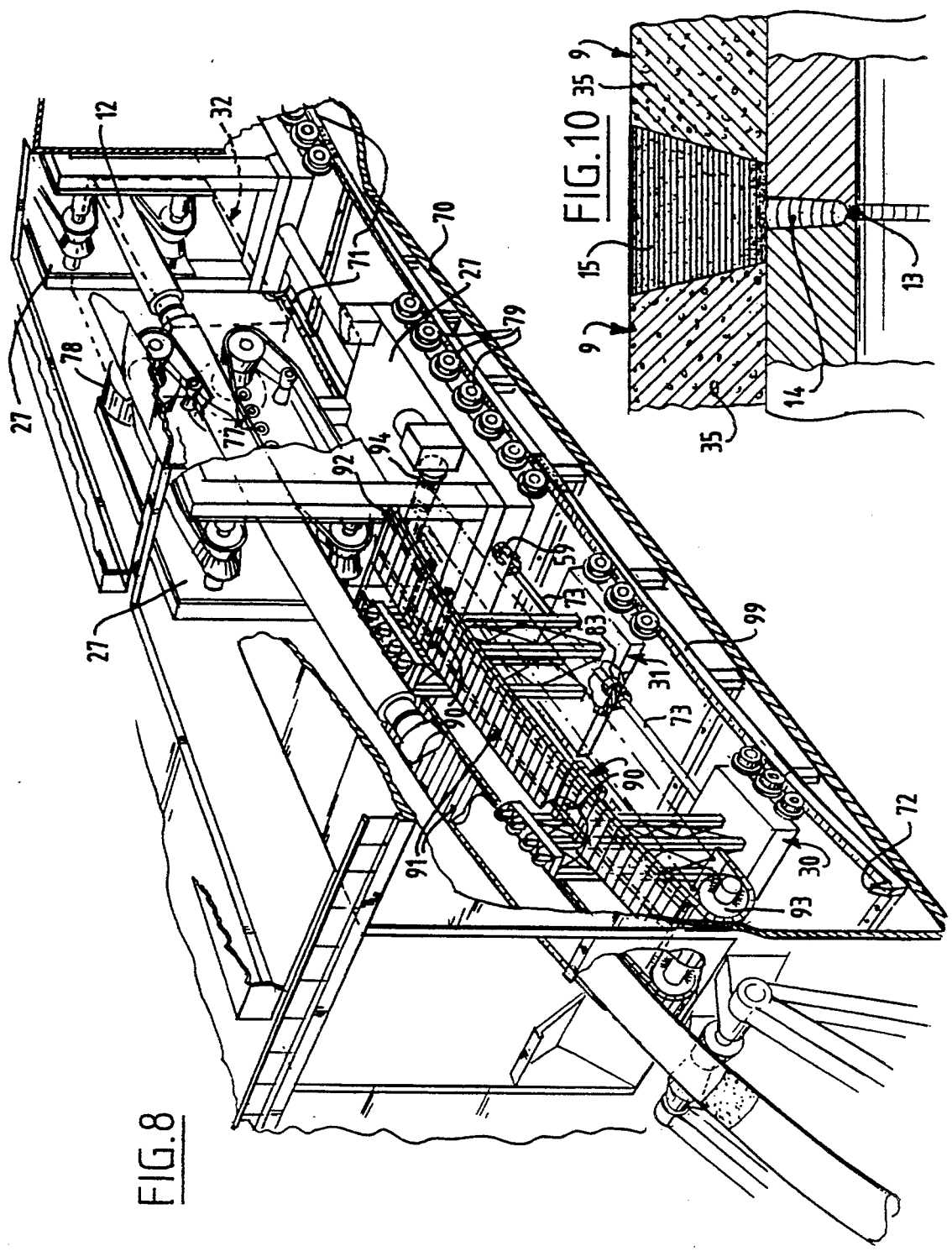
FIG. 8 shows on enlarged scale a perspective, broken away view of detail VIII of FIG. 1.

The installation 1 of FIG. 1 for laying a pipeline 2 on a surface located under water 7 comprises a vessel 3 with directionally adjustable screws 4 and 5 and bow steering screws 6 with which the vessel 3 can be moved forward in arrow direction 8 under computer control at a set speed and direction irrespective of the flow direction of the water 7. The vessel 3 has a workplace (not shown) where a number of, for example two, pipe pieces are welded together and these welds are protected with anticorrosive layers for the manufacture of pipes 9 with a length for example of 24 meters.

These pipes 9 weighted with concrete 35 are transported from a storage place 10, optionally via the said workplace, to a fitting station 11 where they are fitted piece by piece behind a pipe string 12 and where a first weld 13 (FIG. 10) is made. Afterwards the welding layers 14 and the anticorrosive protective layers 15 are arranged successively. The welding work is meanwhile checked.

At the fitting station 11 in the bow of vessel 3 the pipes 9 are lifted with a lifting frame 16 and placed via a cross conveyor (not shown) onto rollers 20 of a carriage 21.

A pipe 9 for fitting is in each case fitted behind and against a pipe string 12 with the carriage 21 using a per se known aligning tool and a centred welding device.

While the pipe string 12 moves continually rearward in arrow direction 75 relative to the vessel 3, the pipe 9 for fitting is placed in alignment and welded in place with the first weld 13. In the meantime the pipe 9 for fitting is supported by the carriage 21 which moves along with the pipe string 12 at the same speed in arrow direction 75.

According to the invention the vessel 3 has a ship's floor 70 with rails 71. Thereover runs a train of successively a carriage 21, a welding carriage 26, a support carriage 28, a welding carriage 26, a support carriage 28, a welding carriage 26, a support carriage 28, a welding carriage 26, a support carriage 28, a welding carriage 26, a clamping carriage 27, a welding carriage 26, a clamping carriage 27, an inspection carriage 32 for checking the welding work, a clamping carriage 27 and two support carriages 30 and 31.

The said carriages of this train are mutually coupled such that during the operational phases they move as a whole with the pipe string 12 in rearward direction 75 over the rails 71 in relation to the vessel 3 and that in a resetting phase set between two operational phases they move forward as a whole in relation to the pipe string 12 and in relation to the vessel 3. The support carriages 30 and 31 herein form the exception in that during the operational phase support carriage 30 comes to a halt against a stop 72, wherein a coupling rod 73 shifts relative to carriage 31 until the carriage 31 comes to a stop against carriage 30. The coupling rod 73 then shifts relative to the coupled clamping carriage 27.

During the resetting phase the rearmost clamping carriage 27 first carries along support carriage 31 when a stop end 59 of coupling rod 73 is carried along with this clamping carriage 27. In the same manner support carriage 30 is carried along at a later stage by support carriage 31 in forward direction by means of a stop 83 of coupling rod 73.

At the start of the operational phase the carriage 21 does not move along with the train in rearward direction 75 but first approaches the train after picking up a pipe 9 to then move along further to the rear with the train. The train holds the pipe string 12 fixedly by means of the three clamping carriages 27 which are each provided with two endless belts 76 which are pressed with resiliently suspended pressure rollers 77 against pipe string 12 and which are braked by units 78. The clamping carriage 27 travelling with rollers 79 over the rails 71 bears the endless belts 76 by means of a frame 115. Each clamping carriage 27 holds the pipe string 12 fast with a considerable braking force of for instance 100 tons.

The train is then held fixedly by the vessel 3, that is, braked in the operational phase with a force of three tons, by means of coupling means consisting for instance of a toothed rack 80 fixed to the train and units 81 of which pinions 82 engage in the toothed rack.

During the resetting phase the units 81 drive the train in the direction of the prow of vessel 3, wherein instead of a braking force of for instance three hundred tons a propulsion force of slightly more than three hundred tons is required. In order to save energy the units 81 and 78 are mutually coupled such that the braking energy of units 78 is also utilized to drive the units 81. For this purpose the units take for instance an electrical, hydraulic or electric-hydraulic form.

Figure 9:
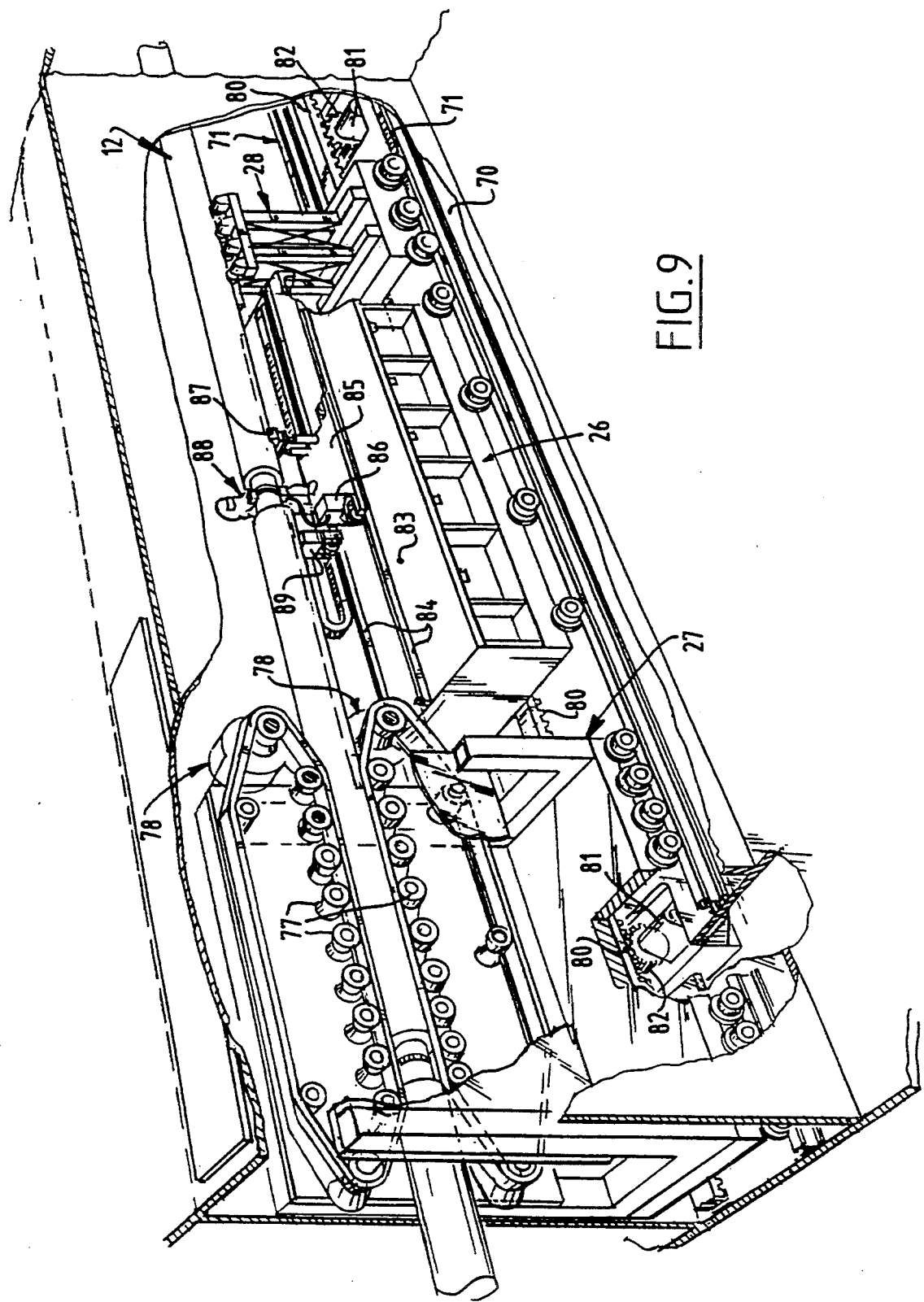
FIG. 9 shows on enlarged scale a perspective, broken away view of detail IX of FIG. 1.

FIG. 9 shows that each welding carriage 26 is provided with a work-floor 83 with rails 84 over which travels a welding platform 85 which carries a welding unit 86, a coupling device 87 and a drive motor 89. Welders 88 can carry out their welding work on welding platform 85, in particular when this welding platform is coupled to the pipe string 12 by means of the coupling device 87. When the reset phase begins, the welding platform 85 remains coupled to the pipe string 12 some little time so that welding platform 85 is still moving rearward while the welding carriage 26 is already moving forward. When welding platform 85 thus comes close to clamping carriage 27 the welding platform is released from pipe string 12 and the welding platform is driven in forward direction relative to welding carriage 26 such that the welding equipment is present at the following joint on time for the start of the following operational phase.

Via consoles 90 the support carriages 30 and 31 support flexible work-floors 91, one end 92 of which is coupled in each case to the rearmost clamping carriage 27 and the other end of which is reversed on a reversing roller 93 which is situated in a fixed position relative to the vessel 3 and which end is tensioned by means of reels 94 of a winch placed on the rear clamping carriage 27. On these work-floors 91 stand the people who inspect the welds and coat the welding locations with the protective layers 15. Situated in the recess 96 is a stinger 97 which holds pipe string 12 in a required bend depending on the laying depth. The connecting piece 98 of pipe string 12 has an adapted arc. The rails 71 therefore have at this piece 98 an adapted arc 99 over which the last carriages run. This arc 99 is either adjustable or exchangeable when pipelines are laid at different depths. The stinger 97 is also provided with a work-floor 100 on which people can finish the pipe string.

We claim:

1. Method for laying a pipeline (2) on a surface located under water which includes on a vessel (3) fitting a pipe to a pipe string (12) of the pipeline (2), each time during a fitting step while this pipe (9) is held in line behind the pipe string (12) by means of positioning means (21) and is welded to the pipe string welding means (26), which also includes during the fitting step moving the vessel (3) substantially continuously in lengthwise direction of the pipe string (12) while fitting a pipe (9) to the pipe string (12) by moving of positioning means (21) relative to the vessel (3) and by moving welding means (26) relative to the vessel (3), characterized in that during an operational phase moving a train of positioning means (21), welding means (26) and clamping means (27) relative to the vessel (3) in lengthwise direction of the pipe string (12) substantially together with the pipe string (12) and that during a resetting phase set between two successive operational phases, displacing said train in the direction of the prow of the vessel (3) relative to the pipe string (12) and relative to the vessel (3), wherein the pipe string (12) is held fixedly on said train by means of the clamping means (27) and wherein said train is held fixedly on the vessel (3) by means of coupling means (80, 81, 82).

2. Method as claimed in claim 1, which includes moving a welding platform (85) of at least one welding carriage (26), along the pipe string (12).

3. Method as claimed in claims 1 or 2, which includes during the resetting phase driving the coupling means (80, 81, 82) using energy recuperated from the braking energy of the clamping means (27).

4. Installation (1) for laying a pipeline on a surface located under water comprising a vessel (3) sailing substantially continuously during operation which is provided with positioning means (21) for holding a pipe (9) in line behind a pipe string (12) of the pipeline (2); welding means for fixedly welding said pipe (9) to the pipe string (12) and clamping means (27) for holding the pipe string (12) under tensile stress, characterized by a train of positioning means (21), welding means (26) and clamping means (27) which during an operatinal phase is movable substantially together with the pipe string (12) relative to the vessel (3) and which train during a resetting phase set between two successive operational phases is displaceable in the direction of the prow of the vessel (3) relative to the pipe string (12) and relative to the vessel (3), wherein the clamping means (27) are adapted to hold the pipe string (12) fixedly relative to the train and wherein coupling means (80, 81 82) hold the train fixedly relative to the vessel (3) and can displace the train in the direction of the prow during said resetting phase.

5. Installation (1) as claimed in claim 4, characterized in that at least one welding carriage (26) carries a welding platform (85) movable along the pipe string (12) relative to the welding carriage (26).

6. Installation as claimed in claim 4 or 5, characterized by coupling means (80, 82) with a unit (81) which is connectable during the resetting phase to at least one unit (78) of the clamping means (27).

* * * * *